US009728047B2

(12) United States Patent
Rottman

(10) Patent No.: US 9,728,047 B2
(45) Date of Patent: Aug. 8, 2017

(54) SYSTEM AND METHOD FOR MANAGING ONE OR MORE GAMES OF CHANCE OVER A NETWORK

(71) Applicant: FabForeDev LLC, Tappan, NY (US)

(72) Inventor: Martin Rottman, Tappan, NY (US)

(73) Assignee: FabForeDev, LLC, Tappan, NY (US)

( * ) Notice: Subject to any disclaimer, the term of this patent is extended or adjusted under 35 U.S.C. 154(b) by 0 days.

(21) Appl. No.: 15/054,029

(22) Filed: Feb. 25, 2016

(65) Prior Publication Data

US 2016/0253878 A1 Sep. 1, 2016

Related U.S. Application Data

(63) Continuation of application No. 14/634,334, filed on Feb. 27, 2015, now abandoned.

(51) Int. Cl.
*A63F 13/00* (2014.01)
*G07F 17/32* (2006.01)

(52) U.S. Cl.
CPC ...... *G07F 17/3293* (2013.01); *G07F 17/3225* (2013.01); *G07F 17/3276* (2013.01)

(58) Field of Classification Search
None
See application file for complete search history.

(56) References Cited

U.S. PATENT DOCUMENTS

| | | | | |
|---|---|---|---|---|
| 4,828,264 A | 5/1989 | Rutigliano | | |
| 5,445,391 A * | 8/1995 | Gleason, Jr. | A63F 1/02 | 273/138.1 |
| 6,155,567 A * | 12/2000 | Keleher | A63F 1/00 | 273/138.1 |
| 6,543,774 B1 * | 4/2003 | Taylor | A63F 1/00 | 273/292 |
| 6,692,359 B1 | 2/2004 | Williams et al. | | |
| 7,111,845 B2 | 9/2006 | Walker et al. | | |
| 2005/0216346 A1 | 9/2005 | Kusumoto et al. | | |
| 2006/0186598 A1 * | 8/2006 | Coussa | A63F 1/00 | 273/292 |

(Continued)

OTHER PUBLICATIONS

Liars Poker, current as of Feb. 10, 1986, http://elmfunds.com/upload/Iprules.pdf (5 pages).

(Continued)

*Primary Examiner* — Jason Yen
(74) *Attorney, Agent, or Firm* — Baker Hostetler LLP; Gregory A. Grissett

(57) ABSTRACT

Implementing games of chance across multiple computing devices is described. An electronic hand is associated with each computing device. The electronic hand includes a set of characters having a value. An electronic bid, which is a total quantity of a character of the set characters at a particular value, is initiated. An electronic challenge to the electronic bid is initiated. An actual quantity of the character at the particular value in the bidding electronic hand is determined. A point value is allocated to the bidder if the actual quantity of the character at the particular value is greater than or equal to the total quantity of the character at the particular value in the electronic bid. The point value is adjusted based on a bid value, and/or bid level, and/or the number of participants.

26 Claims, 12 Drawing Sheets

(56) References Cited

U.S. PATENT DOCUMENTS

| | | | | |
|---|---|---|---|---|
| 2006/0267282 | A1 * | 11/2006 | Duse | A63F 1/00 273/292 |
| 2006/0273515 | A1 * | 12/2006 | Bogdanovic | A63F 1/00 273/292 |
| 2008/0108403 | A1 * | 5/2008 | Lewis | G07F 17/3293 463/13 |
| 2009/0023488 | A1 * | 1/2009 | Lewis | G07F 17/3293 463/13 |
| 2012/0115590 | A1 * | 5/2012 | Rowe | G07F 17/32 463/25 |
| 2014/0148244 | A1 | 5/2014 | Souza et al. | |

OTHER PUBLICATIONS

Probabilities in Liar's Poker, The Wizard of Odds, last updated Apr. 7, 2013, http://wizardofodds.com/games/liars-poker/ (5 pages).

* cited by examiner

300

312 350a 350b 350c 350d 350n

310

| | Player 1 | Player 2 | Player 3 | Player 4 | Player n |
|---|---|---|---|---|---|
| A | 66320102 | 91331655 | 46029506 | 87741858 | 46130756 |
| B | 03524988 | 40253122 | 74294377 | 84844437 | 51437919 |
| C | 85109615 | 71105813 | 87569519 | 76742268 | 88813880 |
| D | 13197213 | 79262919 | 13391094 | 29318620 | 71570356 |
| E | 37723847 | 97365830 | 38596186 | 87146128 | 84416590 |
| F | 84291313 | 58814455 | 97725228 | 62375370 | 16083880 |
| G | 81276909 | 29775082 | 61145247 | 70467075 | 03080010 |
| H | 91036404 | 90154569 | 80710603 | 21545980 | 36515226 |
| J | 12998922 | 23627916 | 26150778 | 52942893 | 11749590 |
| K | 87450134 | 38028990 | 77707369 | 03042902 | 56463595 |
| L | 39892511 | 05922696 | 10173642 | 30585572 | 15553326 |
| M | 40264328 | 22912306 | 42340428 | 89252668 | 67004994 |
| N | 92325343 | 6777078 | 97327648 | 92957890 | 15330501 |
| P | 93159314 | 56029736 | 78717886 | 03287941 | 19635370 |
| Q | 68576916 | 45138929 | 71237588 | 79036843 | 42211594 |

Figure 3

Figure 6
500
509
Cancel
Multiplayer Game
510
2 - 4 players
512
Me
Auto-match
Auto-match
Auto-match
514
516
Invite Friend
Play Now

SYSTEM AND METHOD FOR MANAGING ONE OR MORE GAMES OF CHANCE OVER A NETWORK

CROSS-REFERENCE TO RELATED APPLICATION

The present application is a continuation of U.S. application Ser. No. 14/634,334 filed Feb. 27, 2015, the entire disclosure of which is incorporated by reference into this application.

TECHNICAL FIELD

The present disclosure relates to a system and method for managing one or more games of chance over a network.

BACKGROUND

Multi-player computer games are in demand. Advances in communication networks and increased computing speeds have nurtured this market and allowed developers to meet this market need. Numerous games are now available through the various application stores online and or through other web-based portals. While demand is high, competition is fierce and differentiation among available games within a category is essential for successful game development and deployment. Games of chance, such as poker, Liar's poker and others, have been implemented through web portals prior to widespread use of gaming platforms, such as Apple's Game Center and others. Early online versions of games of chance simply reproduced graphically on a computing device the basic game format and rules of play. These early versions lacked functionality that improved how various networked computing devices interact to escalate the level of play during a game.

SUMMARY

Embodiments of the present disclosure include a system and method for implementing one or more games among a plurality of computing devices that are associated with a respective plurality of game participants. The method can include associating an electronic hand with each one of the plurality of game participants and the electronic hand including a set of characters with each character having a value. The method can include receiving an electronic bid from one computing device of the plurality of computing devices, wherein the electronic bid is an indication of a total quantity of a particular character of the set characters at a particular value among each electronic hand associated with the respective plurality of game participants. The method can include receiving an electronic challenge concerning the electronic bid from each remaining computing device of the plurality of computing devices. The method can also include determining an actual quantity of the particular character at the particular value among each one of electronic hands associated with the respective plurality of game participants. In response to receiving the electronic challenge from each remaining computing device of the plurality of computing devices, the method includes the step of comparing the actual quantity of the particular character at the particular value to the total quantity of the particular character at the particular value in the electronic bid. The method includes allocating a point value (or number of units) to the game participant associated with the one computing device if the actual quantity of the particular character at the particular value is greater than or equal to the total quantity of the particular character at the particular value in the electronic bid, wherein the point value is adjusted by a multiple determined by A) at least one of a bid value and bid level, and B) the number of game participants, the bid level being the total quantity of particular characters in the electronic bid.

Another embodiment is a system that includes a computer processor configured to associate an electronic hand with each game participant, each electronic hand including a set of characters, each character having a value. The system can include a computer memory having stored therein in response to receiving 1) an electronic bid from one computing device of the plurality of computing devices, wherein the electronic bid is an indication of a total quantity of a particular character of the set characters at a particular value among each one of the electronic hands that was allocated to the respective plurality of game participants, and 2) an electronic challenge concerning the electronic bid from each remaining computing device of the plurality of computing devices. The computer processor is further configured to A) determine an actual quantity of the particular character at the particular value among each electronic hand, B) compare the actual quantity of the particular character at the particular value to the total quantity of the particular character at the particular value in the electronic bid, and C) allocate a point value to the game participant associated with the one computing device if the actual quantity of the particular character at the particular value is greater than or equal to the total quantity of the particular character at the particular value in the electronic bid. The point value increases by a multiple determined by a) at least one of a bid value and a bid level, and b) the number of game participants, the bid level being the total quantity of particular characters in the electronic bid.

BRIEF DESCRIPTION OF THE DRAWINGS

The foregoing summary, as well as the following detailed description of an example embodiment of the application, will be better understood when read in conjunction with the appended drawings, in which there is shown in the drawings example embodiments for the purposes of illustration. It should be understood, however, that the application is not limited to the precise systems and methods shown. In the drawings:

FIG. 3 is an exemplary data table created via the gaming application used to associate electronic hands with each game participant and determine the sequence of rounds for a game session;

DETAILED DESCRIPTION OF ILLUSTRATIVE EMBODIMENTS

The present disclosure includes a system, method, and associated software gaming application for implementing a multiplayer game of Liar's poker over networked computing devices. In the basic version of Liar's poker, each player is dealt a U.S. monetary note, such as a dollar bill with the "hand" being the 8-digit serial number on the note. Through successive bidding, players try to determine the total quantity of a particular digit across all hands knowing only their own hand and inferring what others may have through their bids, which may or may not be truthful. Once a bid is made it must subsequently be raised or challenged. When all players challenge a bid, a count of the particular digit across all hands determines if the bidder has won or lost, in equal amount from or to the other players. The present disclosure includes a version of Liar's poker implemented as a gaming application running across multiple computing devices with additional functional features that modify play based on inputs from each computing device. The gaming application facilitates implementation of the game over distributed, networked computing devices. The result is improved game functionality and player experience.

Figure 1:
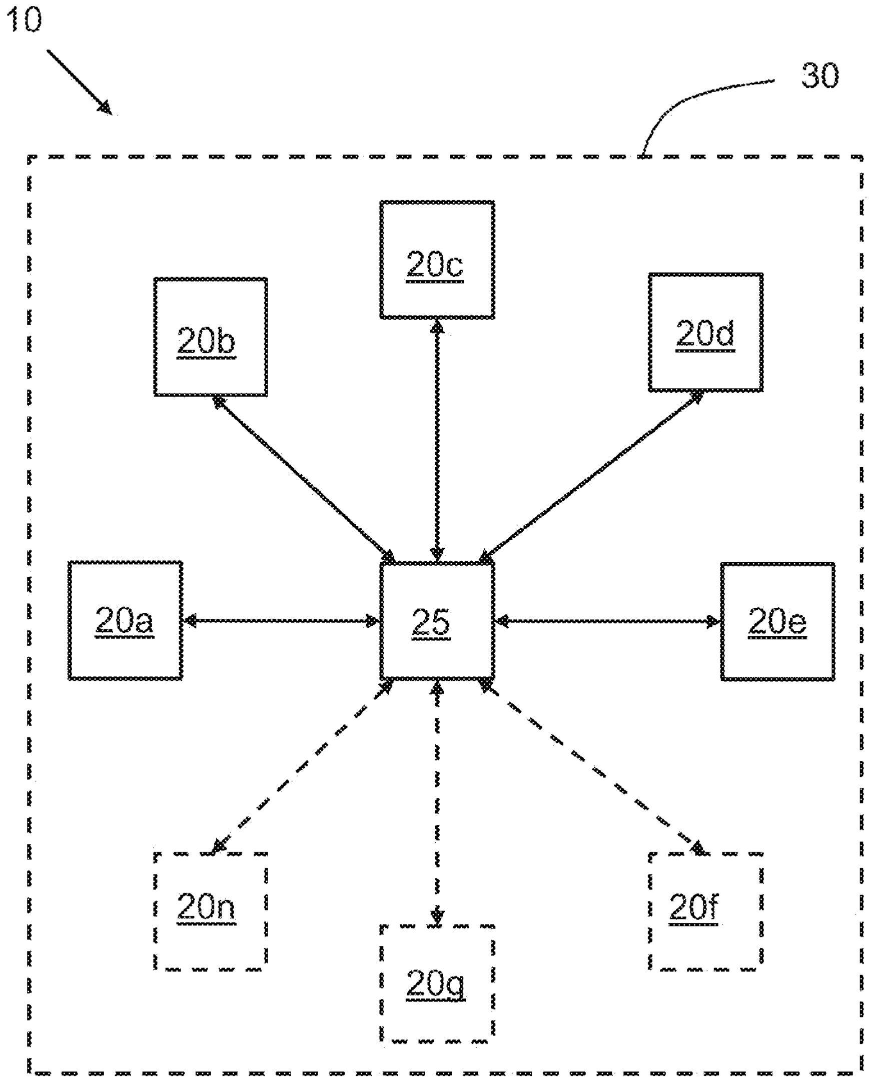
FIG. 1 is an exemplary diagram illustrating a plurality of computing devices each associated with a game participant and a gaming platform for implementing a gaming application for a game of chance, according to an embodiment of the present disclosure.

Referring to FIG. 1, the game system 10 includes a plurality of computing devices 20*a*, 20*b*, 20*c*, . . . , 20*n*, and 25 in electronic communication with each other via network. The computing devices 20*a*-20*g* may be associated with a gaming platform 30, such as Apple's Game Center, Google's Game Play, or other similar platform. The gaming platform 30 is illustrated schematically in dashed lines in FIG. 1. For purposes of clarifying how the gaming application is implemented across multiple computing devices, reference number 20 is used interchangeably with reference numbers 20*a*, 20*b*, 20*c* . . . , 20*n*, and 25, unless noted otherwise. Each computing device 20 may be associated with a game participant. Each game participant can participate in a game by associating their computing device 20 with the gaming platform 30. Once associated with the gaming platform 30, the game participant can enter and participate in games with other game participants as will be further detailed below. FIG. 1 illustrates computing devices 20*a*, 20*b*, 20*c* . . . 20*n* and 25 associated with the gaming platform 30.

Continuing with reference to FIG. 1, the game system 10 is implemented via exemplary architecture that includes computing devices 20*a*, 20*b*, 20*c* . . . , 20*n* in electronic communication with each other via a common communications network, such as, for example the Internet. As illustrated, the computing devices 20*a*, 20*b*, 20*c*, . . . , 20*n* are arranged in a client-server architecture. In the illustrated embodiment, computing device 25 can function as a server-type computing device dedicated to hosting a portion or all of the gaming software application. The server-type computing device 25 also receives and transmits data regarding each hand of a game to all other computing devices associated with a particular game. When the gaming application has been installed on the server-computing device 25, the gaming application can transfer information between other computing devices via the common network. It should be appreciated that one or all the computing devices 20 can receive information from the other computing devices. One or all of the computing devices 20 can also transmit information to the other computing devices. Further, one or all of the computing devices 20 can access information on the other computing devices. "Access" or "accessing" as used herein can include retrieving information stored in memory on a computing device. For instance, "access" or "accessing" includes sending instructions via the network from computing device 25 to computing device 20*a* so as to cause information to be transmitted to the memory of the computing device 20*a* for access locally by the computing device 20*a*. In addition or alternatively, "access" or "accessing" can include the computing device 25 sending an instruction to computing device 20*a* to access information stored in the memory of the computing device 20*a*. Reference to computing devices 20*a* and 25 in this paragraph is exemplary and are used to only clarify use of words "access" or accessing."

FIG. 1 illustrates a client-server network. But the gaming application can be implemented over any number of network configurations. For example, in alternate embodiments, the computing devices 20*a*, 20*b*, 20*c* . . . , 20*n* are configured as a peer-to-peer network architecture. In still other alternative embodiments, the computing devices 20*a*, 20*b*, 20*c*, . . . , 20*n* can be arranged in a ring-type network architecture. Further, the gaming application can be implemented across computing devices arranged on a network that includes aspects of a client-server network, peer-to-peer network, ring-type network, and/or other network architectures known to a person of ordinary skill in the art. Accordingly, it should be appreciated that numerous suitable alternative communication architectures are envisioned.

Figure 2:
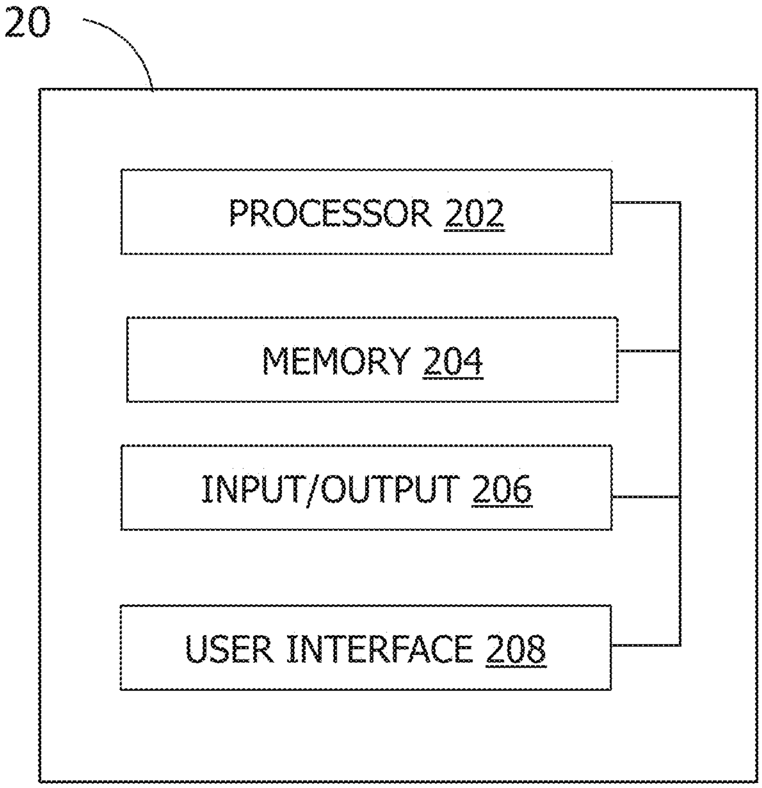
FIG. 2 is an exemplary computing device illustrated in FIG. 1.

Referring FIG. 2, the computing devices are configured to receive, process, and store various information used to implement the gaming application. Computing devices 20*a*-20*g* and 25 are similar and for ease of illustration only computing device 20 will be described below. The computing device 20 may be configured to run one or more software applications, including the gaming application that implements a game of chance, such as an enhanced version of Liar's poker. It will be understood that the hardware components of computing device 20 can include any appropriate device, examples of which include a portable computing device, such as a laptop, tablet or smart phone, or other computing devices, such as a desktop computing device or a server-computing device. As illustrated, the computing device 20 includes one or more processors or processing portion 202, a memory or memory portion 204, an input/ output 206, and a user interface (UI) 208. It is emphasized that the block diagram depiction of the computing device 20 is exemplary and not intended to imply a specific implementation and/or configuration. The processor 202, memory 204, input/output portion 206 and user interface 208 can be coupled together to allow communications therebetween. As should be appreciated, any of the above components may be distributed across one or more separate devices and/or locations.

Continuing with FIG. 2, in various embodiments, the input/output portion 206 includes an antenna or an electronic connector for wired connection, or a combination thereof. In some implementations, input/output portion can include a receiver and transmitter, transceiver or transmitter-receiver. The input/output 206 is capable of receiving and/or providing information pertaining to communication with a network such as, for example, the Internet. As should be appreciated, transmit and receive functionality may also be provided by one or more devices external to computing device 20. For instance, the input/output 206 can be in electronic communication with the receiver.

Depending upon the exact configuration and type of processor, the memory 204 can be volatile (such as some types of RAM), non-volatile (such as ROM, flash memory, etc.), or a combination thereof. The computing device 20 can include additional storage (e.g., removable storage and/or non-removable storage) including, but not limited to, tape, flash memory, smart cards, CD-ROM, digital versatile disks (DVD) or other optical storage, magnetic cassettes, magnetic tape, magnetic storage or other magnetic storage devices, universal serial bus (USB) compatible memory, or any other medium which can be used to store information and which can be accessed by the computing device 20.

The computing device 20 can contain the user interface 208, which can include an input device and/or display (input device and display not shown) that allows a user to communicate with the computing device 20. The user interface 208 can include inputs that provide the ability to control the computing device 20, via, for example, buttons, soft keys, a mouse, voice actuated controls, a touch screen, movement of the computing device 20, visual cues (e.g., moving a hand in front of a camera on the computing device 20), or the like. The user interface 208 can provide outputs, including visual displays, such as exemplary display screens illustrated in FIGS. 5-11. Other outputs can include audio information (e.g., via speaker), mechanically (e.g., via a vibrating mechanism), or a combination thereof. In various configurations, the user interface 208 can include a display, a touch screen, a keyboard, a mouse, an accelerometer, a motion detector, a speaker, a microphone, a camera, or any combination thereof. The user interface 208 can further include any suitable device for inputting biometric information, such as, for example, fingerprint information, retinal information, voice information, and/or facial characteristic information, for instance, so as to require specific biometric information for access to the computing device 20. It should be appreciated that the computer devices can operate via any suitable operating system, such as Android, BSD, iOS, Linux, OS X, QNX, Microsoft Windows, Windows Phone, and IBM z/OS. Furthermore, the gaming application can operate with any of the aforementioned operation systems.

How the game of chance is implemented across a plurality of computing devices 20 will be described next. Typically a player installs a version of the gaming application on their respective computing device 20. When multiple computing devices 20 are running the gaming application and are in electronic communication with the other via the gaming platform 30, information concerning the game can be displayed via the user interface on each computing device. In general, each player is "dealt" an electronic hand for a round of play. Multiple rounds of play comprise a "SLIP" or "Slip", and one or more Slips comprise a game session. As explained below, the gaming application executed by the processor 202 "deals" electronic hands by associating electronic hands with a computing device and its respective game participant. An electronic hand includes a set of characters each having a value. Each character value can be randomly generated. In any particular electronic hand, the value of the character may be unique. It is not necessarily true in every circumstance that the value of the character will be completely unique. For example, the probability of the gaming application generating two identical electronic hands is very low. In the described embodiment, the electronic hand is an 8 digit alphanumeric character set. In one example, the electronic hand can include an 8-digit number, such as "51898756." The electronic hand can include fewer than 8 digits or more than 8-digits. In just one example, the electronic hand corresponds to serial numbers on U.S. monetary notes, such as a dollar bill. In another example, the electronic hand can include an 8-digit letter set, such as "BFAYFAMN." The word "value" when associated with an electronic hand is the relative value with reference to other characters. For example, the value of the character is one of the numbers 1, 2, 3, 4, 5, 6, 7, 8, 9, and 0. In one embodiment, value increases from 1 to 0 such that "0" is assigned a greater value than 1, 2, 3, 4, 5, 6, 7, 8, and 9. In such an embodiment, "0" has a greater value than "9," "9" has a greater value than "8," etc. In other embodiments, the value of "0" is assigned a value less than the value of 1, 2, 3, 4, 5, 6, 7, 8, and 9. In such an embodiment, "1" has a greater value than "0," "2" has a greater value than "1", etc. The gaming application is configured to randomly assign electronic hands to each player and their computing device for each round of play. In one embodiment, the players would have different electronic hands for each round or SLIP. Randomly assigning electronic hands to each player during each round can prevent any one player from obtaining an advantage by "learning" other players hands when playing from one SLIP to another SLIP with the same group of players.

During a round of play, a player bids on (or challenges) using the computing device, a total quantity of a particular character among each electronic hand held by all of the players in the game. A bid is an estimate of the total quantity of a particular character across all hands at a particular value. Each player can also review the other player's electronic bids, bid history, and other data concerning the game. A winning bidder receives points or units from each player. Accordingly, point values are allocated to each player depending on the outcome of the particular round and bids/challenges. For instance, if a first player makes a certain electronic bid, is challenged, and the gaming application determines the first player's bid was correct, the gaming application allocates points to the first player. If the first player loses the challenge, points are allocated to every other player. The point values may be stored for each round and a running total for a number of rounds (such as a game session) may be displayed in each computing device as further detailed below. In at least one example, there are a limited number of points available for allocation among each game participant so that progression of each round in such an embodiment results in a "zero-sum" game. The gaming application includes additional features, such as "multiples" and special bid types, e.g. "none-bids" and "hero-bids" that escalate the level of play among the game players. More specific details concerning how the game is implemented over networked computing devices will be described next.

The gaming application can manage a game session that includes between two and up to twelve participants in a round of play. In one embodiment, the game session can include two participants. In another embodiment, the game session can include three participants. In another embodiment, the game session can include four participants. In another embodiment, the game session can include five participants. In another embodiment, the game session can include six participants. In another embodiment, the game session can include seven participants. In another embodiment, the game session can include eight participants. In another embodiment, the game session can include nine participants. In another embodiment, the game session can include ten participants. In another embodiment, the game session can include eleven participants. In another embodiment, the game session can include twelve participants. It should be appreciated that the game session could include more than twelve participants, such as twenty or more. Furthermore, more than one game session can be running at any given time.

FIG. 3 illustrates an exemplary data table for compiling a game session 300 that organizes multiple rounds of play 310 and electronic hands 350 for each player. As shown in FIG. 3, the rows include a row identifier 312 for the rounds of play 310, illustrated as rows A through Q, and the columns represent each computing device and its associated player 1, 2, 3 . . . n. A cell where a row and column intersect represents an electronic hand for the particular player for a given round. As illustrated, each round of play 310 includes a plurality of the electronic hands 350*a*, 350*b* . . . 350*n*, each of which is associated with a different player's computing device. For instance, in round A, a first electronic hand 350*a* will be associated with the first computing device 20*a* of a first game player 1. A second electronic hand 350*b* will be associated with a second computing device 20*b* of a second game player 2. A third electronic hand 350*c* will be associated with a third computing device 20*c* of a third game player 3. A fourth electronic hand 350*d* will be associated with a fourth computing device 20*d* of a fourth game player 4. Additional electronic hands 350*n* will be associated with additional computing devices 20*n* for each additional game player n.

Continuing with reference to FIG. 3, the game session 300 (sometimes referred to as a "SLIP") progresses with an initial round where each player initiates electronic bids (or challenges) as noted above. A round may be completed when 1) all the players challenge a previous electronic bid, and 2) a count is initiated. A count is initiated at the election of the bidding participant or a count is forced after all game participants challenge a successive bid by the same bidder. After the count is made and points are allocated, another round is initiated and the bid-challenge sequence repeats for each player. The session 300 illustrated includes 15 rounds of play denoted as A through Q. The rounds of play 310 are selected based on progression of the game and nature of the bids during play and will be described in more detail below. Further, for each new game session, the gaming application can generate a new series of rounds and new electronic hands for each participating computing device 20. It should be appreciated that the session 300 can include fewer than the 15 rounds or may also include more than 15 rounds.

Figure 4:
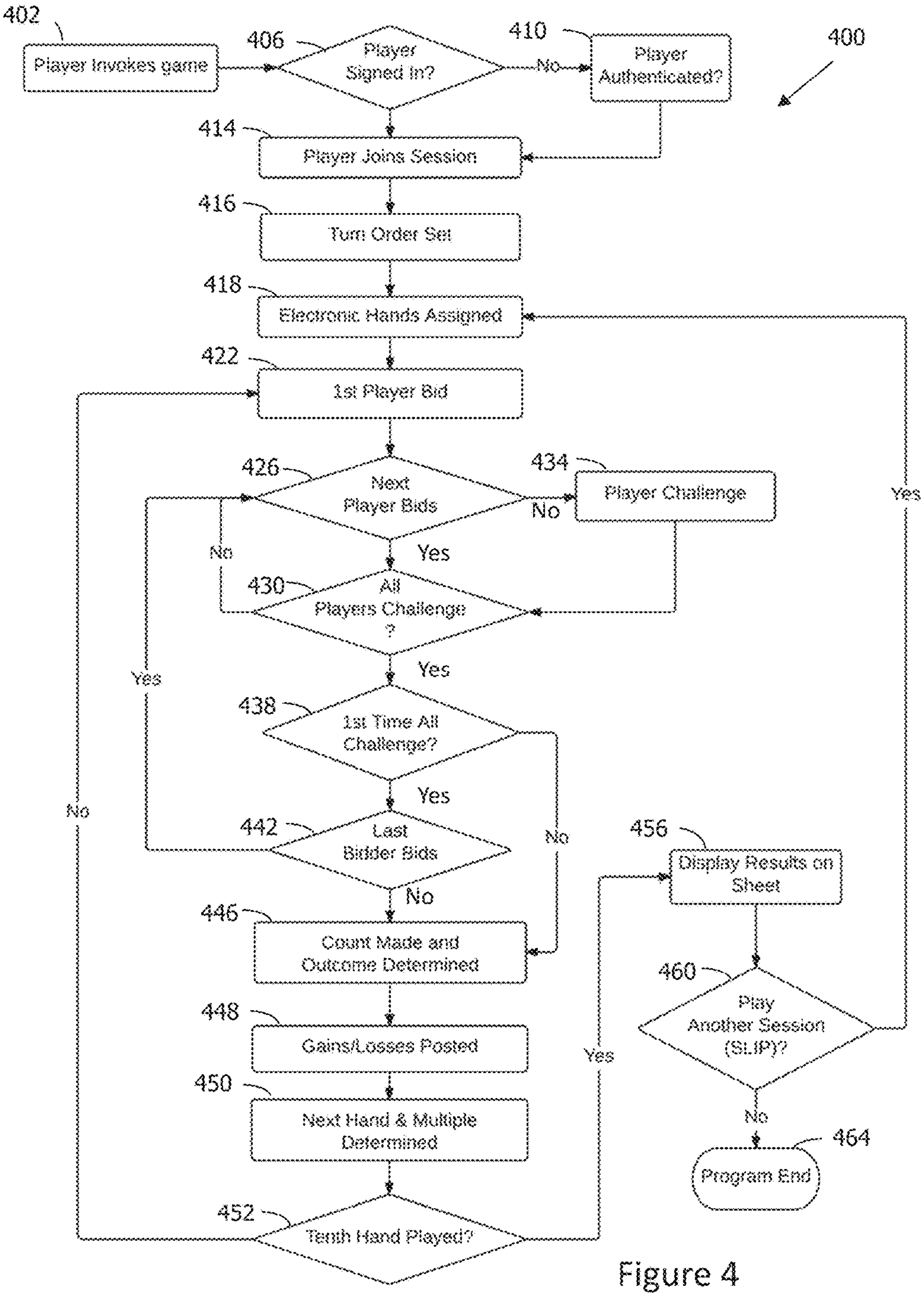
FIG. 4 is a process flow diagram illustrating a method for implementing a game session across the plurality of networked computing devices illustrated in FIG. 1.

FIG. 4 illustrates an embodiment of a method 400 for implementing the game of chance over the system 10 described above. For ease of illustration, method 400 described below refers to the server computing device 25 and computing device 20. Each prospective player or game player associates their respective computing device 20 with a gaming platform 30 (FIG. 1) as noted above. In some embodiments, prospective players can purchase a software application that implements the game on their associated computing device 20. For example, each prospective player can purchase the gaming application via Apple's App Store and download the gaming application into the memory portion of the computing device 20. It should be appreciated that certain aspects of the gaming application are executed "locally" on each game participant's computing device, such as computing devices 20*a*-20*g* (FIG. 1), while other aspects of the gaming application are executed on the server-type computing device 25 (FIG. 1). Further, each player may have an account associated with the gaming platform and/or the gaming application. The player's account includes a unique identifier associated with a single game participant. A player may logon to the participant's account using any particular computing device that includes the gaming application.

In block 402, a game participant initiates a command via the user interface on their respective computing device 20 to invoke the game application. Process control is transferred to block 406. In block 406, the computer processor, for example running on computing device 25 (FIG. 1), can determine if the computing device 20 is signed onto an existing game. If the computing device 20 is not signed onto an existing game, process control is transferred to block 410 and the player is authenticated. After authentication, process control is transferred to block 414. If, however, in block 406 a determination is made that the computing device 20 is signed into the application, process control is transferred to block 414.

In block 414, the computing device 20 can either join a particular game session among the one or more game sessions that may be active or initiates a new game session. Process control is transferred to block 416. In block 416, the turn order is set. "Turn order" signifies the order in which each respective game participant bids/challenges during a round. When the turn order is set in block 416, process control can be transferred to block 418.

In block 418, each electronic hand is associated with a respective computing device. In this manner, the gaming application "deals" each participant an electronic hand that is displayed via the user interface on the computing device 20. The electronic hand is based on the particular hand determined for the session and round.

When the electronic hands are assigned, the processor can compile a sequence of play. The sequence of play may be compiled in block 418 or any other stage of the game. For instance, the sequence of play can be compiled at a particular phase of the game, stored in memory, and applied as needed throughout game play. Alternatively, the sequence of play can be compiled as the game progresses. In any event, the processor can arrange a number of rounds, among all possible plurality of rounds (see rows A-Q in FIG. 3), for the game session into a particular sequence of play. The sequence of play can be based on a quantity of a particular character in each electronic hand in one or more of the plurality of rounds. In just one example, once the gaming application has compiled the SLIP with fifteen rounds A through Q (as illustrated in FIG. 3), the gaming application cycles through a sequence of play that includes ten rounds out of the fifteen total rounds. The sequence of play initiates with an initial round A of electronic hands 350*a*-350*d* as shown in FIG. 3. Each subsequent round in the sequence of play is determined by skipping the number of rounds equal to the number of odd numbers in the last digit of each electronic hand for that round. For example, as illustrated with session 300 as an exemplary data set, the processor determines that the first round of electronic hands 350 illustrated as "Row A" includes only one odd number in the last digit (see electronic hand 350*b*). Based on that determination, the processor determines that the next, or second round of play is illustrated as Row C. The second round of play illustrated as Row C includes three odd numbers in the last digit of the electronic hands. Based on the second round of play, the processor determines the next, or third round of play is illustrated as Row Gin FIG. 3. The third round of play includes three odd numbers in the last digit (see participants 1, 3, 4, Row G). The processor determines that the next, fourth round of play is Row L as illustrated in FIG. 3. The fourth round of play includes one odd number in the last digit (see participant 1, Row L). The processor determines that the next, fifth round of play is illustrated as Row N in FIG. 3. The sequence of play continues in this manner through ten rounds of play to complete a game Slip. If, however, the processor determines that the next round of play is Row Q as illustrated in FIG. 3, the processor counts the number of odd numbers among each electronic hand in Row Q. As illustrated in FIG. 3, Row Q includes two odd numbers in the last digit of each electronic hand (see participants 2 and 4, Row Q.) The processor then cycles through rounds beginning at the top, skipping completed rounds. In such an example, the round of play after Row Q will be Row F (skipping Rows B and D, and the already played rounds illustrated as Rows A, C, and E). In other words, in order to determine the sequence of rounds, the processor cycles through each of the fifteen rounds A through Q until ten rounds of play are determined.

It should be appreciated that a sequence of play can be developed according to any number of modifications to the methods and operation described above. For example, any number of possible rounds can be compiled to develop the sequence of play. While 15 possible rounds A-Q are shown in FIG. 3, more than 15 or fewer than 15 possible rounds can be used. In further examples the sequence of play can include more than ten rounds. For example, up to 20 or 30 rounds can define a sequence of play. In still further alternatives, fewer than 10 rounds may define the sequence of play. In another example, the sequence of play can be assigned randomly, prior to the initiating the game. In alternative embodiments, the gaming application can be configured to permit each player to select their particular hand on a game session 300 or SLIP. For instance, a first player may be permitted to select row or hand A, a second player could select Row (or hand) C, and third player can select Row M. Player hand selection can be provided as an in-application purchase or as a wholly separate application. Selection of a "Slips Select" input icon on the user interface (not shown) can invoke a method of obtaining payment and/or purchase authorization. Upon payment authorization, the hand selection functionality is operable within the gaming application.

In block 418, the gaming application applies a starting multiple to a round of play. Later in the game, in block 450, multiples for subsequent hands are set and applied to the round of play. Regardless, the gaming application is configured to determine and implement a multiple that is applied to a point value for each round. A multiple as used herein means a value by which a point total (or unit total) is multiplied in order to determine a final point (or unit) value for each player in a given round.

The gaming application is configured to vary the multiple based on the progression of the game, and/or the type of bids made during the round of play. Because the gaming application varies the multiple based on the progression of play, the possible increase of point allocation varies with each successive bid. The "stakes" of winning can escalate or change based on the sequence of bids. The gaming application is configured to manage and implement the escalation and de-escalation of point allocation during the rounds of play. As noted above, a starting multiple for the first hand is set in block 418. In later stages of the game, however, the multiple may be determined based one either A) one or more characteristics of the electronic bid, or B) one or more characteristics of the electronic bid and the number of game participants. As used herein, a characteristic of the electronic bid can be a bid value or a bid level. The bid value is the value of the particular character in the electronic bid initiated by a game participant during a round of play. The bid level is the total quantity of particular characters in an electronic bid. In one example, the multiple can be 2× when the bid level is equal to three more than the total number of game participants. In such an example, if there are 4 game participants and the bid level is "7", the multiple for that particular round is "2×." In another example, the multiple can be 3× when the bid level is equal to five more than the number of game participants. In yet another example, the multiple can be 4× when the bid level is equal to seven more than the number of game participants. Accordingly, the multiple varies as the round of play, or successive bidding, progresses.

In one embodiment, the gaming application can vary the multiple as the round of play progresses by adjusting the multiple if certain predetermined types of electronic bids are made. The multiple can be adjusted by an adjustment value that is based on at least one of: 1) the bid value, and 2) a bid level and the number of game participants. The adjustment value can be "double," "triple," "quadruple," or any other factor by which the multiple can be adjusted. In one example, the multiple is doubled when an electronic bid includes a bid value of "6". In another example, the multiple can be quadrupled if the electronic bid includes a bid value of "6". Further, the particular character that is used to determine the adjustment value for the multiple can be any predetermined character, such as a "7", "9", "A", "L" or any other character.

The multiples further limit point allocation from the losing bidder to the other players and can increase point allocation to the winning bidder in a final hand. In one example, a losing bid loses no more than the starting multiple to each player. On the other hand, a winning bidder will be allocated points based on the final multiple from each player. For instance, in a four player game where the starting multiple is 2×, a losing bid loses 6 points, with 2 points allocated from the losing bidder to the remaining three players, regardless of the final multiple. If the final multiple reached 4×, however, a winning bidder would be allocated 12 points—4 points from the remaining three players. However, in the example where the final multiple reached 4×, the losing bidder would only lose 6 points—2 points to each remaining player based on the starting multiple of 2×. Accordingly, losing bids are constrained by the incoming multiple and winning bidders garner the final multiple payout, which is either the same or higher than the incoming multiple. The gaming application combines the multiples into one display field on the user interface; the processor is configured to manage win/loss payouts according to the preceding logic.

Referring back to block 418, the processor determines the starting multiple for each round of play during a game session. When a first round of play is initiated, such as the round identified as Row A in FIG. 3, the starting multiple can be "1×". The processor then executes an instruction to apply a multiple of "1×" to the initial round of play. If a particular round is not an initial round of play, the processor applies the ending multiple to the next round of play, as noted in block 450.

Figure 8:
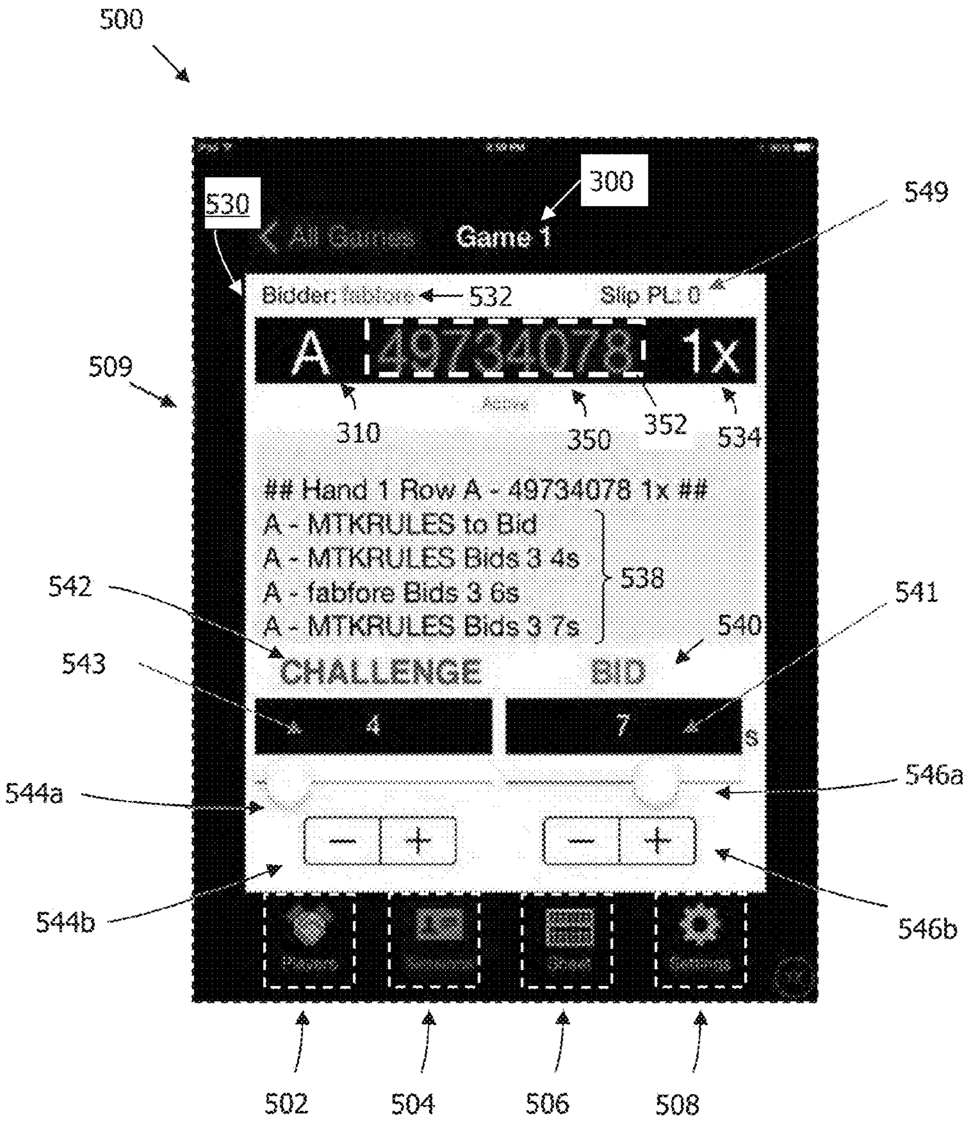
FIG. 8 is a front view of a graphical user interface for a display screen or portion thereof shown in FIG. 7, illustrating an exemplary screen displaying a player's interface during a round of play on the gaming application and showing bid and challenge options.

Once the electronic hands are assigned in block 418, process control is transferred to block 422. In block 422, the first player initiates an electronic bid. The electronic bid is an indication of a total quantity of a particular character of the set characters at a particular value among each one of the electronic hands that was allocated to the respective plurality of game participants during a round. The electronic bid is a player's assessment of the number of characters "held" in each electronic hand by all players. In one example the electronic bid can be an indication that there are five (5) "7s" among all the electronic hands associated with each game participant. In block 422, the first player sets and initiates the electronic bid via the user interface, e.g. by engagement of input 543 (Level), input 541 (Value), and input 540 (BID) as shown in FIG. 8. Initiation of the electronic bid via the user interface causes the first players' computing device 20 to transmit the electronic bid to the server-computing device 25. The server-computing device then causes the first player's electronic bid to be displayed across each computing device. After the first player initiates an electronic bid, a subsequent player can initiate an electronic bid or challenge the bid as further explained below. For instance, the next or second player can initiate an electronic bid via the user interface, which causes the second players' computing device to transmit the electronic bid to the server-computing device 25. The server-computing device 25 then causes the second player's electronic bid to be displayed across each player's respective computing device. In certain embodiments, the gaming application may require each subsequent bid to raise the level of the previous bid. For example, if 4 "4s" are bid, the next bid should be raised to five (5) "4s" or four (4) "5s." When the electronic bid is initiated, process control is transferred to block 426, as further discussed below. In some embodiments, equal or lesser bids compared to the previous bid are not permitted. In such embodiment, the processor validates the bid by determining if the bid is greater than the previous bid.

In certain examples, the game application can adjust point allocations based on the type of bid placed by the bidder. In initiating the electronic bid in block 422, a bidding player can initiate a "none" electronic bid or "none-bid." A "none" electronic bid is an electronic bid that includes an indication of a particular character that is absent from the player's electronic hand. A "none" bid succeeds when there are none of that particular character among all other players. For instance, the computing device 25 may receive an indication that a game participant is initiating a "none-bid." The processor determines, among all of the characters in each electronic hand, if the particular "none-bid" character is present. If none of the electronic hands includes the "none-bid" character, then the point allocation is increased by a predetermined amount. In one example, the predetermined amount is 2n−6, where n is the number of players. However, in this example, a "none-bid" is invalid in a 2-person game, there is zero payout in a 3-person game, and double payout in a 4-person game, etc.). The starting multiple of the round after the "none-bid" can be any particular multiple. In some examples, the starting multiple of the round after a "none-bid" is double, or "2×". If the round is the final (e.g. the tenth) round of play, the starting multiple is doubled to "4×". If, however, the processor determines that one or more of the electronic hands includes the "none-bid" character, then the "none-bid" fails and the point allocation is not modified, remaining subject to the incoming multiple alone.

In another example, in the step of initiating an electronic bid as described above in block 422, the initiated "none-bid" can result in a "hero" electronic bid, sometimes called a "hero-bid." The "hero-bid" is a variation of the "none-bid" where the bidding player does not have the particular character in the bid yet in the count the number of characters present in the remaining electronic hands is still made. If the processor determines that the particular character being bid is absent from the bidding player's electronic hand and the count is still met among the remaining electronic hands, then the point allocation is increased by a predetermined amount. In one embodiment, the predetermined amount can be whatever multiple that bid would have earned plus one. For instance, if the made bid would normally result in a multiple of "2×", the "hero-bid" results in a "3×" multiple. The starting multiple of the round following a "hero-bid" can be any multiple. In some examples, the starting multiple of the hand following the "hero-bid" is the same as in the "none-bid" case, "2×", or in the final round of play, "4×".

Referring now to block 426, the processor determines if the next, or second player, has initiated an electronic bid. If the processor determines the second player has made an electronic bid, process control is transferred to block 430. If, however, the processor determines the second player has not made an electronic bid, process control is transferred to block 434. In block 434, the second player has initiated an electronic challenge. An electronic challenge is electronic indication that the electronic bid initiated by the previous player is false. For example, a player may initiate an electronic challenge that the electronic bid of four (4) "7s" is not correct or true. Process control is transferred to block 430.

In block 430, the processor determines if each game participant has initiated an electronic challenge to the previous player's electronic bid. For instance, the server-computing device 25 may receive an electronic challenge from each computing device associated with each active game participant. If the processor determines that less than all of the player's initiated an electronic challenge to the pending electronic bid, process control is transferred back to block 426 where the subsequent player initiates an electronic bid or an electronic challenge. If, however, in block 430, the processor determines that each player initiated an electronic challenge to the pending electronic bid, process control is transferred to block 438.

In block 438, the processor determines if the electronic challenge initiated in block 430 is the first occurrence in a row where each player initiated an electronic challenge of a bid. In block 438, if the processor determines that the electronic challenge initiated in block 430 is the first occurrence in a row where each player initiated an electronic challenge of a bid, process control is transferred to block 442. But in block 438 if the processor determines that the electronic challenge initiated in block 430 is the second consecutive occurrence where each player initiated an electronic challenge of a bid, process control is transferred to block 446, where a count is made as described below.

Figure 9:
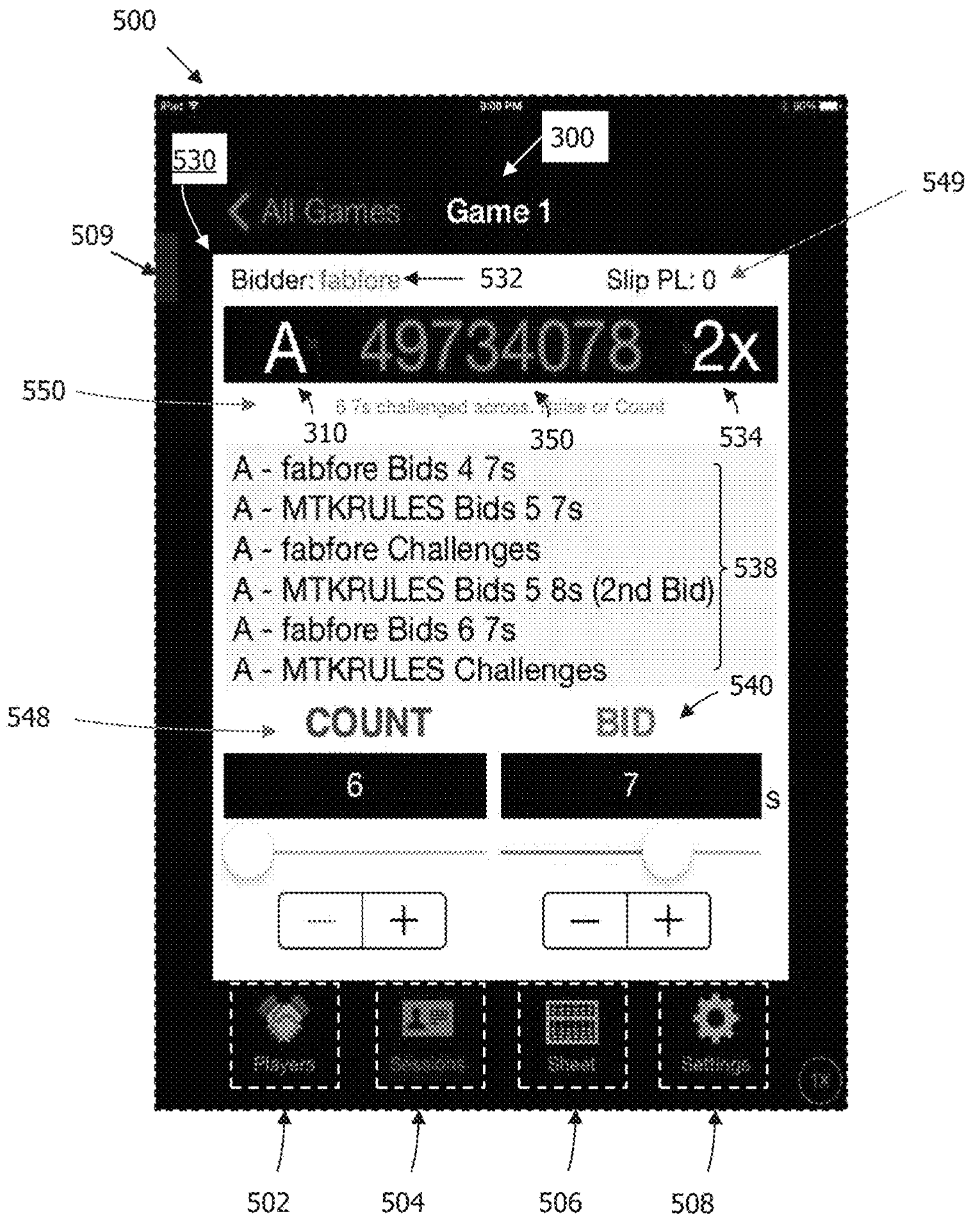
FIG. 9 is a front view of a graphical user interface for a display screen or portion thereof, illustrating an exemplary screen displaying a player's interface during a round of play as shown in FIG. 8, but illustrating bid and count options.

In block 442, the processor determines if the last player has initiated an electronic bid. If the processor determines that the last player initiated the electronic bid, process control is transferred back to block 426. In block 442, the processor can also determine, in response to receiving the electronic challenge from each remaining computing device, if the active or playing computing device initiated a subsequent electronic bid. The subsequent bid would be the bidding player's second bid after being challenged all around by the other players. Second or subsequent bids are typically required to raise at least one of bid level or bid value. As such, the subsequent electronic bid is an electronic indication to raise at least one of the total quantity of particular characters and the particular value of the electronic bid. In block 442, if the processor determines that the player has not initiated an electronic bid, process control is transferred to block 446. In the circumstance where the bidding player has not initiated an electronic bid, the bidding player elects to force a count (e.g. by engagement of user interface input 548 as shown in FIG. 9). Accordingly, in certain examples, the bidding player either raises the bid or forces a count.

In block 446, the processor determines the count and the outcome of the round. A count is a determination of the actual quantity of the particular character at the particular value in the electronic bid that is present in all of the electronic hands held by each player. The outcome is the allocation of points between players based on the results of the round. As noted above, the electronic bid is indication of the total quantity of the particular character at the particular value among all electronic hands. The count can therefore be considered a verification if the electronic bid is true. If the processor determines that the electronic bid is true, the playing bidder wins the round and receives a point allocation for the win. If processor determines that the electronic bid is not true, the bidder loses the round and points are allocated from the playing bidder to the other players for the loss. The electronic bid is verified by comparing the electronic bid to the actual quantity and value of characters across all electronic hands. In one embodiment, in block 446, the processor determines the actual quantity of the particular character at the particular value among each electronic hand held by each player. The processor compares the actual quantity of the particular character at the particular value to the total quantity of the particular character at the particular value as indicated in the electronic bid. The processor allocates a point value to the bidding game participant if the actual quantity of the particular character at the particular value is greater than or equal to the total quantity of the particular character at the particular value in the electronic bid, across all electronic hands. In addition, the processor allocates the point value from the bidding player to each of the other players if the actual quantity of the particular character at the particular value across all the electronic hands is less than the total quantity of the particular character at the particular value in the electronic bid initiated by the bidding player. The point value as determined in block 446 can be adjusted by the multiple for the particular hand as described above with respect to block 442 (where the final multiple is for that hand). Furthermore, the point values can be displayed via the user interface for each round of play (see reference output icon 549 in FIGS. 8 and 9). In addition, in block 446, the allocated point values for each player are compiled.

It should be appreciated that progression of the game through blocks 430, 442 and 446 can proceed in accordance with an alternative embodiment. In one alternative embodiment, in block 446, in response to receiving at least two consecutive electronic challenges concerning the electronic bid from at least two respective computing devices, the processor can determine the actual quantity of the particular characters of the set of characters at the particular value among each electronic hand. The processor can proceed with a comparison and subsequent allocation of points based on the results of the comparison, similar to the process as described above. In accordance with the alternative embodiment, however, an electronic challenge from each one of the other players may not be required. For example, when the processor receives a first electronic challenge from one of the computing devices and a second electronic challenge from another computing device, the processor can 1) determine the actual quantity of the particular characters at the particular value among each one of the electronic hands, 2) compare the actual quantity and the total quantity of the particular characters at the particular value, and 3) allocate the points to or from the bidding players. The number of electronic challenges required before the processor initiates the count can be two challenges from two other players, even if there are 4, 6, 8 or 10 other players.

When the processor has determined the count and outcome as noted above, process control is transferred to block 448. In block 448, the processor compiles the allocated point values for each participant and stores the point values in the computer memory. More specifically, the processor allocates the point values for each player as gains and losses and stores the gains and losses for each participant. Furthermore, for each round of play, the gains and losses are displayed on the computing device at output portion 549. In one example, the user interface can display the gains as point value in green (signed +) and losses as a point value in red (signed −). In any event, the processor is configured to cause the gains and losses to be stored in memory until the results of each session are posted on the "Sheet" screen (see 572 in FIG. 11) and further detailed below. Process control is transferred to block 450.

In block 450, the processor determines the starting multiple for the next round of play. In block 450, in the event that a particular round is not an initial round of play, the processor applies the ending multiple from the previous round of play to the next round of play. In other words, for one round, the ending multiple can be the starting multiple for the next round of play. More specifically, the processor executes an instruction to cause the gaming application to apply the ending multiple from the previous round of play to second, or subsequent rounds of play. For example, if the ending multiple in the first round of play is "2×", then the starting multiple in the second round of play is "2×". If, however, the processor determines the round of play is the final round in the sequence of play, the processor increases the multiple from the previous round of play by a predetermined factor. In one example the predetermined factor is 2. In such an example where there are ten total rounds of play in a game session, if the ending multiple on the ninth round of play is "4×", then the starting multiple on the tenth round of play is the product of "4×" and 2, resulting in a starting multiple of "8×." The predetermined factor may be any whole number greater than 1. For example, the predetermined factor can be 2, 3, 4, 5, . . . 10, . . . 20 up to any particular whole number n. In alternate embodiments, however, the predetermined factor can be fractional value, such as 1.10, 1.20, 1.30 . . . 2, 2.10, 2.20, 2.30 . . . up to 3, 3.10 or more. Further, in block 450 the processor can determine the multiple applied to the last bid (as in block 442 where the final multiple is for that hand). Throughout the sequence of play, the gaming application is configured to verify the multiple of the round. The gaming application is configured to display the verified multiple of the round. If necessary, the multiple can be adjusted after each bid (as in blocks 422, 426, and 442). The verification starts at the incoming multiple and is adjusted based on the bid value, bid level, and the number of players, as described above. Process control is transferred to block 452.

In block 452, the processor determines if the final round of play has been completed. For example, where the sequence of play includes ten rounds, the processor determines if the tenth round of play has been completed. If the processor determines that the final round of play has not been completed, process control is transferred back to block 422, where the first player (bidder of record from the previous hand) initiates an electronic bid to start a new round of play. If the processor determines that the final round of play has been completed, process control is transferred to block 456. In block 456, the point value for each participant for each round of play is displayed via the graphical user interface as a "Sheet" screen (see 572 in FIG. 11). Process control is transferred to block 460. In block 460, the processor determines if another game including a sequence of rounds of play is initiated. For instance, any number (or all) of the player's computing devices can initiate a new game. Process control is then transferred back to block 418, where new electronic hands are associated with each player's computing device. If, in block 460, the processor determines that no further games or rounds of play are initiated, the gaming application terminates in block 464.

Figure 5:
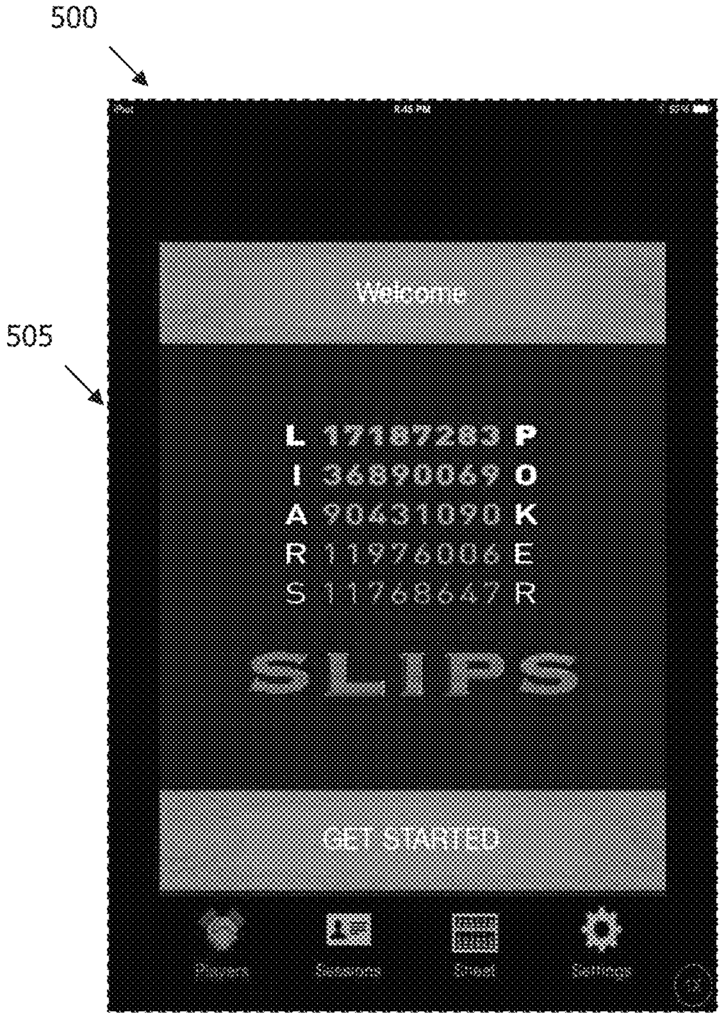
FIG. 5 is a front view of a graphical user interface for a display screen or portion thereof, illustrating an exemplary start screen for a gaming application for a game of chance according to an embodiment of the present disclosure.
Figure 6:
FIG. 6 is a front view of a graphical user interface for a display screen or portion thereof shown in FIG. 5, illustrating an exemplary screen used to initiate a multi-player game in the gaming application.

FIGS. 5 through 11 illustrate exemplary displays of a graphical user interface 500 running on each computing device during a game. FIG. 5 illustrates an initial flash screen 505 for the gaming application as described herein. FIG. 6 illustrates a user interface screen 509, which includes a frame 510 used to initiate a multiple player game via the gaming platform 30. The frame 510 can include and outputs 512, a graphical representation of the player associated with the computing device. The frame 510 can include an input portion 514, selection of which can invite additional players or others to join a game or download the gaming application. An additional input portion 516 can be used to launch the gaming application on the computing device 20. Selection of input portion 516 causes the user interface to display screen 509 and frame 520 illustrated in FIG. 7.

Figure 7:
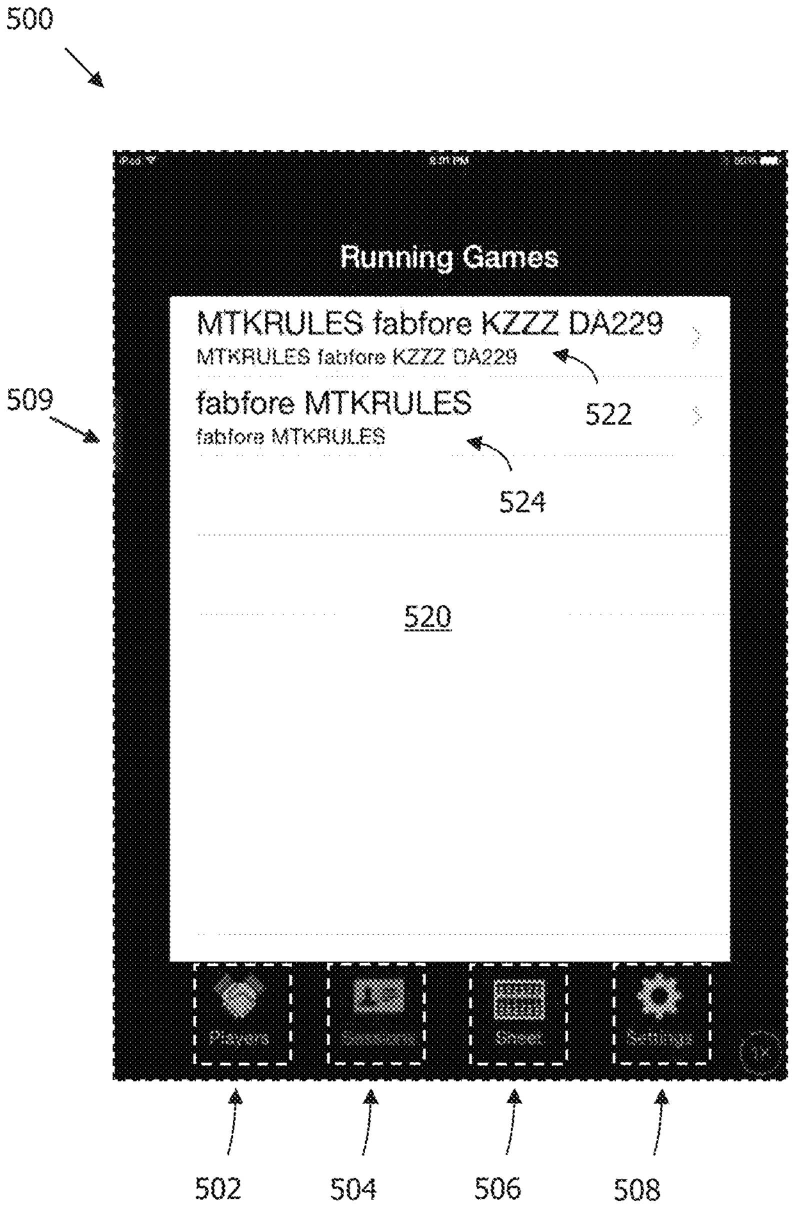
FIG. 7 is a front view of a graphical user interface for a display screen or portion thereof shown in FIG. 6, illustrating an exemplary screen displaying multiple running game sessions in the gaming application.
Figure 11:
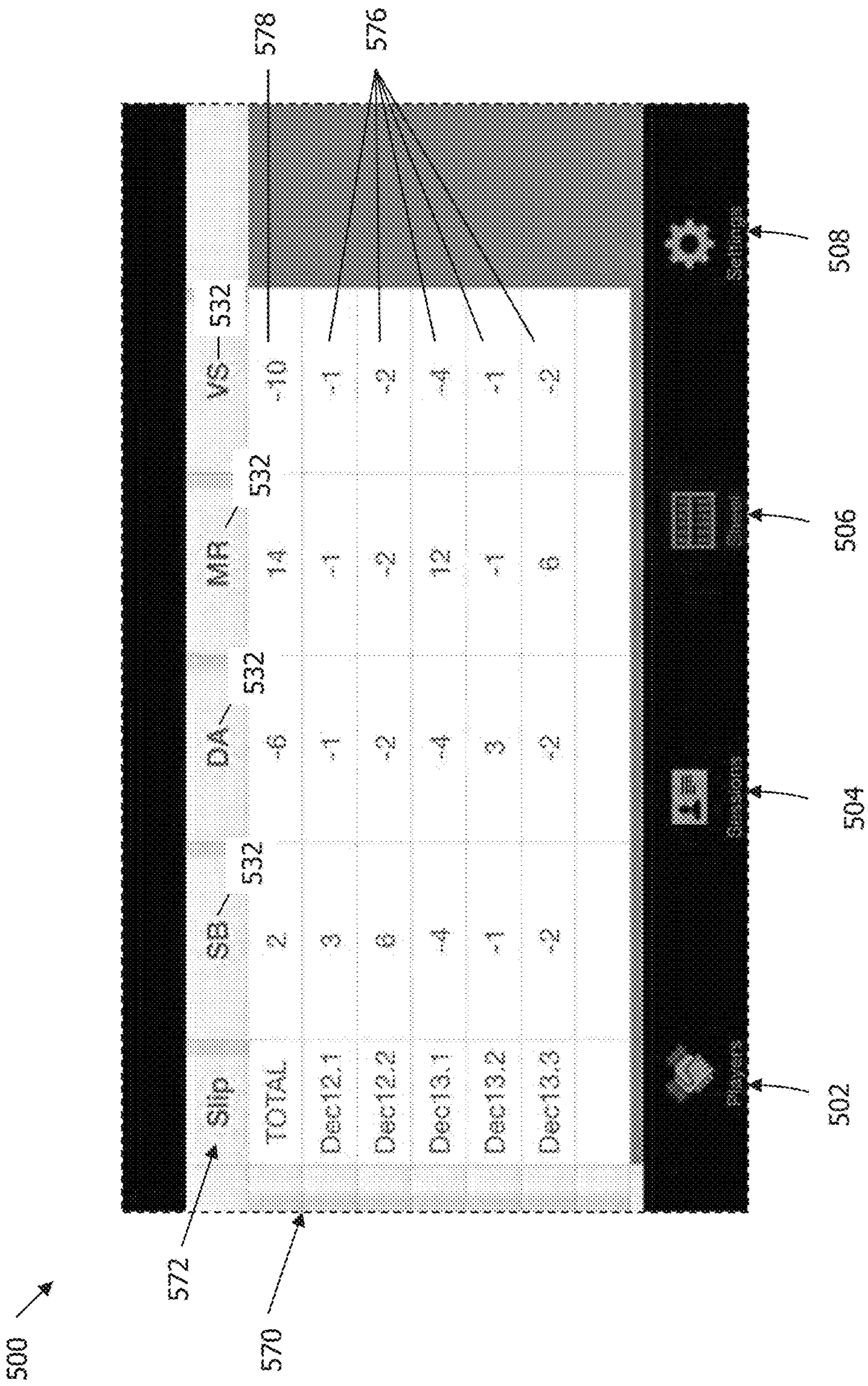
FIG. 11 is a front view of a graphical user interface for a display screen or portion thereof, illustrating an exemplary screen displaying a progression of multiple played rounds of a game session.

As shown in FIG. 7, displayed frame 520 includes tabs 502, 504, 506 and 508. Selection of a particular tab 502, 504, 506 and 508 causes the user interface 500 to pull up various frames for playing and/or managing the game. Selection of tab 502 can cause the frame 510 for inviting additional players (see FIG. 6) to display on screen 509. Selection of tab 504 causes the user interface to display an active game sessions frame 520. Selection of tab 506 causes the user interface to display a Sheet frame 570 (FIG. 11). Selection of tab 508 causes the user interface to display a settings frame (not shown).

Continuing with FIG. 7, the active sessions frame 520 includes listings of games sessions 522 and 524. The user or player can select session 522 and 524 to join either of the active game sessions. Selection of session 524 may cause the user interface to display frame 530 as shown in FIG. 8.

FIG. 8 is a view of the graphical user interface displaying frame 530 that allows players to participate in a round of play during a session 300. Frame 530 includes various outputs regarding the game. For instance, frame 530 includes a bidder identifier 532, round of play 310, the current electronic hand 350, and multiple 534. Other information includes a listing 538 of each players previous electronic bids and current bid. During a hand, the current bid is a combination of what is displayed in the bid level field 543 and bid value field 541 (e.g., the current bid is the number of the particular character indicated). The bid level field 543 shows the quantity of the specific character shown in the bid value field 541. The frame 530 includes several inputs associated with initiating an electronic bid, such as a slide features 544*a*, 546*a* and +/−inputs 544*b*, 546*b* which can be used to increase or decrease the magnitude of the bid level and bid values as illustrated in bid level field 543 and bid value field 541. Input button 540 can be used to submit a bid. Additional input 542 allows a player to challenge another player's bid. Input 352, represented in dashed lines around electronic hand 350, can be used to invoke a window 580 that displays information concerning the current session. The window 580 is further described below. The frame 530 includes indicator field 543 for the selected bid level and indicator field 541 for the selected bid value. Furthermore, the frame 530 includes point identifier indicator 549, identified as "Slip PL." The point value indicator 549 displays the game player's accumulated point value. In the event the game player wins a bid or challenge, the processor allocates the point value to the game player, and further causes the user interface to display the accumulated points at point value indicator 549. In one example, if the point value is positive, the point value indicator and value may be displayed with a positive sign (+) in the color green. If, however, the game player loses a bid or challenge, points are removed from that players point accumulation. In one example, if the point value is negative, the point value indicator and value may be displayed with a negative sign (−) in the color red. Any other colors could be used as needed to display positive and negative values.

FIG. 9 shows the graphical user interface 500 displaying frame 550 with additional inputs for a count option 548. The frame 550 includes output and input portions that are similar to those shown in frame 530 illustrated in FIG. 8. For instance, the frame 550 includes a bidder identifier 532, round of play 310, the current electronic hand 350, and multiple 534, which in FIG. 9 has been changed to "2×" from the "lx" shown in FIG. 8. Other information includes the bid listing 538 and point value indicator 549. Though not specially called out in FIG. 9, the frame 550 would also include inputs 544*a*, 544*b*, 546*a*, 546*b*.

Figure 10A:
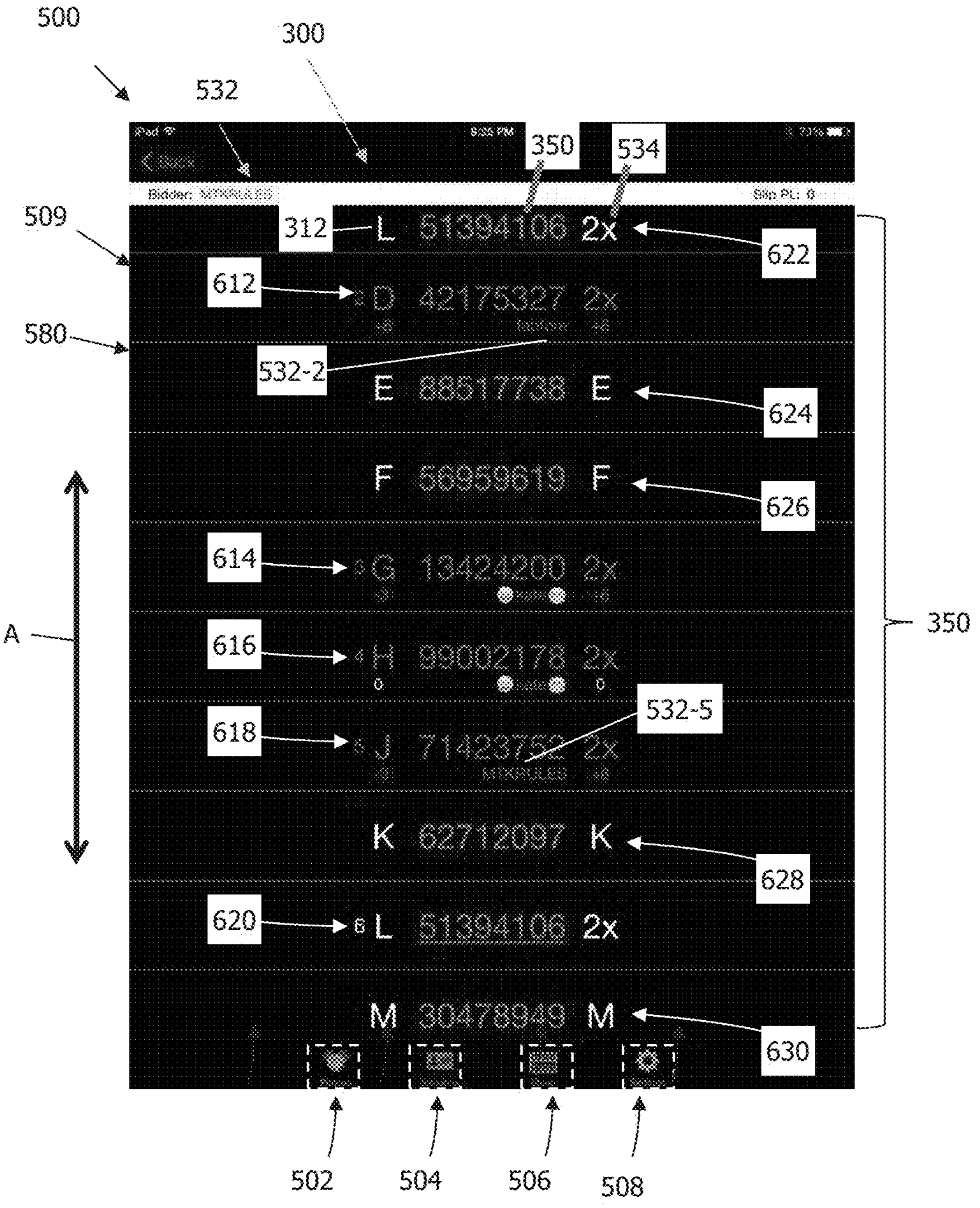
FIGS. 10A and 10B are front and detailed views, respectively, of a graphical user interface for a display screen or portion thereof, illustrating a game slip that includes both played and unplayed hands.
Figure 10B:
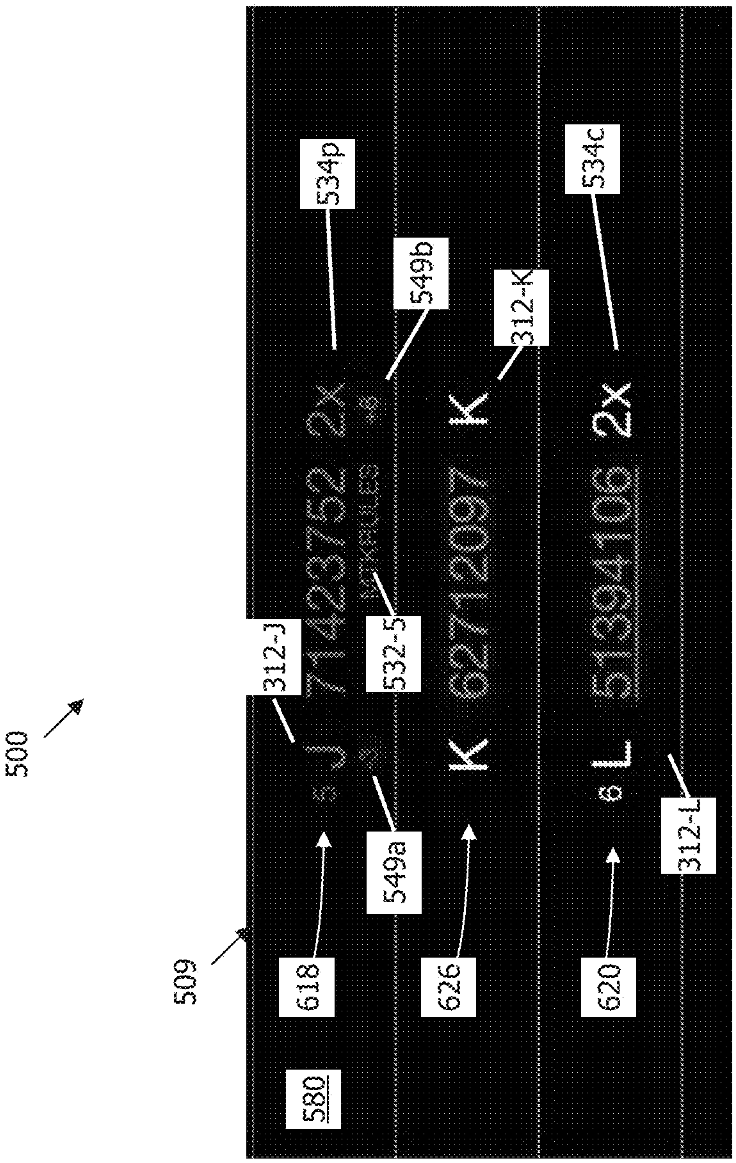

FIG. 10A shows the graphical user interface 500 displaying screen 509 and a scrollable window 580 invoked by the player. FIG. 10B is a detailed view of a portion of window 580 shown in FIG. 10A. As noted above, a player invokes window 580 by depressing electronic hand input button 352 (see FIG. 8). Pressing the window 580 coupled with upward or downward gestures cause the window 580 to scroll up or down in direction along arrow A shown to the left of the screen 509. The window 580 displays information concerning the game session 300 and each electronic hand 350 established for that game session 300. As illustrated, the window 580 displays played hands 612, 614, 616, and 618 numbered consecutively and shaded with a particular color. As illustrated, the color is grey although any color could be used to show played hands. The window 580 also displays un-played hands 624, 626, 628 and 630 in another color that contrasts with the color a played hand is displayed in. As illustrated, the unplayed hands are shown in green although any color could be used. The current hand 620 is shown in green, numbered, and underlined while also maintaining its position at the top of the display. Thus, the current hand is shown as reference numbers 622 and 620 in FIG. 10A. Each hand (played or unplayed) displays a row identifier 312, the electronic hand 350, and incoming multiple 534 for a played or current hand. For unplayed hands, only the row identifier 312 is illustrated to the right of the electronic hand 350. Row identifier 312, hand 350 and multiple 534 are shown with respect to current hand 622. Played hands may include a bidder identifier 532, such as bidder identifier 532-2 for played hand 612 and bidder identifier 532-5 for played hand 618. As shown in FIG. 10B, each played hand includes a row identifier 312 associated with the row of played hands discussed above and shown in FIG. 3. For instance, the played hand 618 includes a row identifier 312-J, indicating that the characters comprising played hand 618 is based on Row J of game session 300. Similarly, unplayed had 626 includes row identifier 312-K, indicating that the characters comprising unplayed hand 626 is based on Row K of game session 300. Current hand 620 includes row identifier 312-L, indicating that the characters comprising current hand 620 is based on Row L of game session 300. Furthermore, the window displays the starting multiple for each played hand. For instance, played hand 618 includes multiple 534*p* shown as "2×." Furthermore, the bidder identifier 532-5 is the bidder associated with played hand 618. In addition, for each played hand, the window 580 displays point losses 549*a* and point gains 549*b*. The current hand 620 includes the incoming multiple 534*c* associated with that hand. The window 580 can be configured as an in-app purchase. Selection of input 352 can invoke a method of obtaining payment and/or purchase authorization.

FIG. 11 shows the graphical user interface 500 displaying frame 570. Frame 570 includes a sheet 572 that displays player identifiers 532, the allocated point totals 576 for each player identifier for each particular game session completed among the group of players. The sheet also includes a value 578 that is a total for all the allocated points for each player identifier for each session. During play, each player can select tab 506 to review point totals.

The gaming application can be configured to cause the display of other information regarding game sessions and electronic hands. For instance, in one embodiment, the processor can be configured to determine the bid probability. The bid probability is a mathematical likelihood of achieving a bid given the number of characters in a hand and the total number of players. The graphical user interface can cause the determined bid probability to be displayed in an additional field, window, or tab (not shown). Bid probability can be configured as an in-application purchase. Selection of input, such as "Bid Probability Gauge" (not shown), can invoke a method of obtaining payment and/or purchase authorization. Upon payment authorization, the bid probability functionality is operable within the gaming application.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

I claim:

1. A method for implementing a game among a plurality of computing devices, the plurality of computing devices associated with a respective plurality of game participants, the method comprising the steps of:

associating an electronic hand with each one of the plurality of computing devices for a round of play, each electronic hand including a set of characters, and each character having a value;

receiving an electronic bid from a first computing device of the plurality of computing devices, wherein the electronic bid is an indication of a total quantity of a particular character of the set characters at a particular value among each electronic hand associated with the respective plurality of computing devices;

receiving an electronic challenge concerning the electronic bid from each remaining computing device other than the first computing device of the plurality of computing devices;

determining an actual quantity of the particular character at the particular value among each one of electronic hands associated with the respective plurality computing devices;

in response to receiving the electronic challenge from each of the remaining computing devices of the plurality of computing devices, comparing the actual quantity of the particular character at the particular value to the total quantity of the particular character at the particular value in the electronic bid;

allocating a point value to the game participant associated with the first computing device if the actual quantity of the particular character at the particular value is greater than or equal to the total quantity of the particular character at the particular value in the electronic bid, wherein the point value is adjusted by a multiple that is based on at least a bid level, wherein the bid level is the total quantity of the particular character in the electronic bid; and causing the multiple to vary for each round of play based on at least one of A) the bid level of the electronic bid and the number of game participants, and B) a bid value, wherein the bid value is the value of the particular character.

2. The method of claim 1, further comprising the step of allocating the point value from the game participant associated with the first computing device to each of the other game participants if the actual quantity of the particular character at the particular value is less than the total quantity of the particular character at the particular value in the electronic bid.

3. The method of claim 1, wherein in response to receiving the electronic challenge from each remaining computing device, further receiving from the one computing device a subsequent electronic bid, the subsequent electronic bid being an electronic indication to raise at least one of the total quantity of particular characters and the particular value.

4. The method of claim 1, wherein in response to receiving a first electronic challenge from a first one of the plurality of computing devices and a second electronic challenge from a second one of the plurality of computing devices, determining the actual number of the particular characters at the particular value among each one of the electronic hands.

5. The method of claim 1, further comprising the steps of:

compiling a game session that includes a plurality of rounds of play, each round associated with a plurality of the electronic hands;

for each round, allocating each electronic hand to each one of a respective computing device; and determining the total point values allocated to each game participant during each round.

6. The method of claim 5, further comprising the step of determining a sequence of the plurality of rounds to be played based on a quantity of a particular character among the plurality of the electronic hands during each round.

7. The method of claim 5, further comprising the step of doubling the point value allocated to the one game participant that initiated the electronic bid when the value of the particular characters in the electronic bid is the same as a predetermined value.

8. The method of claim 7, wherein the value of the character is one of the numbers 1, 2, 3, 4, 5, 6, 7, 8, 9, and 0, and the predetermined value is 6.

9. The method of claim 8, wherein 0 has the greatest value of each of the numbers between 1 and 9.

10. The method of claim 8, wherein 0 has the lowest value of each of the numbers between 1 and 9.

11. The method of claim 1, wherein a game session includes a plurality of rounds, each round including the plurality of the electronic hands associated with each game participant, wherein the method includes the step of causing the ending multiple of a first round of to be applied to a second round that is subsequent to the first round.

12. The method of claim 11, wherein the method includes the step of doubling the multiple applied to the second round in the game session by a predetermined amount when the second round is the final round in the plurality of rounds.

13. The method of claim 1, further comprising the steps of:

receiving a none-value electronic bid from one of computing devices, the none-value electronic bid being an electronic indication that no electronic hand among each one of the plurality of electronic hands includes a particular character of the set of characters; and determining if none of the other of the plurality of the electronic hands associated with the other computing devices include the particular character of the set of characters; and if none of the other of the electronic hands include the particular character, adjusting the point value of the one game participant associated with the one computing device by a predetermined amount, the predetermined amount being based upon the quantity of game participants.

14. The method of claim 13, wherein the predetermined amount is twice the number of game participants less the value of 6.

15. The method of claim 13, further comprising the step of adjusting the point value of the one game participant when the particular character of the set of characters is not present in the electronic hand of the one game participant associated with the one computing device that initiated the electronic bid yet is still present in the remaining electronic hands associated with the other game participants.

16. The method of claim 1, further comprising the step of causing the electronic hand to be displayed via a user interface on the computing device associated with each respective game participant.

17. The method of claim 1, further comprising the step of causing the multiple for a first round of the plurality electronic hands to be displayed on each computing device.

18. The method of claim 1, wherein all of the points allocated to the game participant that initiated the electronic bid is allocated from each of the remaining game participants.

19. The method of claim 1, wherein a game session includes a plurality of rounds and each round is associated with a plurality of the electronic hands, wherein the method includes the step of associating the electronic hands with the respective plurality of computing devices in a random sequence among the rounds.

20. A system for implementing a game among a plurality of computing devices, the plurality of computing devices associated with a respective plurality of game participants, the system comprising:

a computer memory having stored therein a software application that includes instructions configured to implement the game across the plurality of computing devices; and a computer processor configured to execute the instructions so as to associate an electronic hand with each game participant for a round of play, each electronic hand including a set of characters, each character having a value;

a computer memory having further stored therein 1) an electronic bid received from a first computing device of the plurality of computing devices, wherein the electronic bid is an indication of a total quantity of a particular character of the set characters at a particular value among each one of the electronic hands that was allocated to the respective plurality of game participants, and 2) an electronic challenge concerning the electronic bid received from each remaining computing devices other than the first computing device of the plurality of computing devices;

the computer processor further configured to execute the instructions that:

A) determines an actual quantity of the particular character at the particular value among each electronic hand, B) compares the actual quantity of the particular character at the particular value to the total quantity of the particular character at the particular value in the electronic bid, C) allocates a point value to the game participant associated with the one computing device if the actual quantity of the particular character at the particular value is greater than or equal to the total quantity of the particular character at the particular value in the electronic bid, D) adjusts the point by a multiple that is based at least on a bid level, the bid level being the total quantity of the particular character in the electronic bid, and E) causes the multiple to vary for each one of the rounds of play based on at least one of 1) the bid level of the electronic bid and the number of game participants, and 2) a bid value, wherein the bid value is the value of the particular character.

21. The system of claim 20, wherein the computer processor is configured to allocate the point value from the one game participant associated with the one computing device to each of the other game participants if the actual quantity of the particular character at the particular value is less than the total quantity of the particular character at the particular value in the electronic bid.

22. The system of claim 20, wherein the computer processor is configured to:

compile a game session that includes a plurality of the rounds, each round associated with a plurality of the electronic hands, allocate each electronic hand to a respective game participant such that the plurality of the electronic hands are associated with the respective plurality of game participants, and determine the total point values allocated to each game participant during each round.

23. The system of claim 20, wherein the computer processor is configured to, in response to receiving a none-value electronic bid, the none-value electronic bid being an electronic indication that no electronic hand includes a particular character of the set of characters, determine if none of the other electronic hands include the particular character of the set of characters.

24. The system of claim 23, wherein the computer processor adjusts the point value of the one game participant associated with the one computing device by a predetermined amount if none of the other electronic hands include the particular character, wherein the predetermined amount is based upon the quantity of game participants.

25. The system of claim 24, wherein the computer processor is configured to further adjust the point value of the one game participant when the particular character of the set of characters is not present in the electronic hand of the one game participant that initiated the electronic bid but is present in the remaining electronic hands associated with the other game participants.

26. The system of claim 20, wherein the processor is configured to associate the electronic hands with the respective plurality of computing devices in a random sequence among the rounds of play.

* * * * *